United States Patent
Roth et al.

(10) Patent No.: US 9,495,866 B2
(45) Date of Patent: Nov. 15, 2016

(54) COMMUNICATING WITH RESIDENTIAL ELECTRICAL DEVICES VIA A VEHICLE TELEMATICS UNIT

(71) Applicant: General Motors LLC, Detroit, MI (US)

(72) Inventors: Rebecca C. Roth, Novi, MI (US); Paul H. Pebbles, Novi, MI (US)

(73) Assignee: General Motors LLC, Detroit, MI (US)

( * ) Notice: Subject to any disclaimer, the term of this patent is extended or adjusted under 35 U.S.C. 154(b) by 128 days.

(21) Appl. No.: 13/803,217

(22) Filed: Mar. 14, 2013

(65) Prior Publication Data

US 2014/0266635 A1    Sep. 18, 2014

(51) Int. Cl.
  G05B 11/01        (2006.01)
  G08C 17/02        (2006.01)
  H04L 12/28        (2006.01)

(52) U.S. Cl.
  CPC ........... *G08C 17/02* (2013.01); *H04L 12/2818* (2013.01); *G08C 2201/31* (2013.01); *G08C 2201/91* (2013.01); *H04L 2012/2841* (2013.01)

(58) Field of Classification Search
  CPC ................. H04L 12/2825; H04L 12/2834
  See application file for complete search history.

(56) References Cited

U.S. PATENT DOCUMENTS

| | | | |
|---|---|---|---|
| 8,587,404 B2 * | 11/2013 | Laird | 340/5.7 |
| 2006/0280127 A1 * | 12/2006 | Mizuno et al. | 370/254 |
| 2007/0167138 A1 * | 7/2007 | Bauman | G07C 9/00309 455/41.2 |
| 2009/0144624 A1 * | 6/2009 | Barnes, Jr. | 715/719 |
| 2013/0231784 A1 * | 9/2013 | Rovik et al. | 700/276 |
| 2013/0234863 A1 * | 9/2013 | Vos et al. | 340/870.03 |
| 2013/0249688 A1 * | 9/2013 | Nguyen et al. | 340/539.13 |

* cited by examiner

*Primary Examiner* — Omeed Alizada
(74) *Attorney, Agent, or Firm* — Christopher DeVries; Reising Ethington P.C.

(57) ABSTRACT

A method of communicating with residential electrical devices using a vehicle telematics unit includes receiving information identifying a residential electrical device to control; displaying in a vehicle one or more controlled features of the identified residential electrical device; receiving from a vehicle occupant a selection of the displayed controlled features of the residential electrical device; sending an instruction from the vehicle telematics unit to the residential electrical device via a wireless carrier system in response to the received selection; and controlling the residential electrical device using the sent instruction.

19 Claims, 3 Drawing Sheets

COMMUNICATING WITH RESIDENTIAL ELECTRICAL DEVICES VIA A VEHICLE TELEMATICS UNIT

STATEMENT REGARDING FEDERALLY-SPONSORED RESEARCH

This invention was made with government support under Award DE-EE0002628 awarded by the Department of Energy. The government has certain rights in the invention.

TECHNICAL FIELD

The present invention relates to vehicle telematics units and more particularly to communicating with residential electrical devices using a vehicle telematics unit.

BACKGROUND

Vehicles are frequently equipped with vehicle telematics units, which can provide a wide range of communications and vehicle monitoring services. The vehicle telematics units can place cellular calls from the vehicle as well as monitor vehicle function for trouble both at the vehicle and as part of a vehicle telematics service. Owners of vehicles having vehicle telematics units also frequently live at a residence or home that includes a number of electrical or electro-mechanical devices such as HVAC, indoor/outdoor lighting, and personal computers, that rely on user settings and/or input to function optimally. Before leaving the residence, a vehicle owner can adjust the settings of the electrical or electro-mechanical devices so that they operate efficiently while the owner is away from the residence. However, after the vehicle owner establishes the user settings, the environment in which the residence exists may change and those settings may no longer be optimal. Thus, it may be helpful if the user settings of these electrical or electro-mechanical devices could be altered while the vehicle owner is away from the residence.

SUMMARY

According to an embodiment, there is provided a method of communicating with residential electrical devices using a vehicle telematics unit. The method includes receiving information identifying a residential electrical device to control; displaying in a vehicle one or more controlled features of the identified residential electrical device; receiving from a vehicle occupant a selection of the displayed controlled features of the residential electrical device; sending an instruction or command from the vehicle telematics unit to the residential electrical device in response to the received selection; and controlling the residential electrical device using the sent instruction.

According to another embodiment, there is provided a method of communicating with residential electrical devices using a vehicle telematics unit. The method includes receiving information identifying a residential electrical device to control; linking the identified residential electrical device to a boundary distance measured from a residence; determining that the vehicle telematics unit has moved within or beyond the boundary distance from the residence; and sending a command from the vehicle telematics unit to the residential electrical device in response to the determination.

According to yet another embodiment, there is provided a method of communicating with residential electrical devices using a vehicle telematics unit. The method includes linking the vehicle telematics unit with a residential electrical device controlled by a vehicle owner; monitoring for messages at the vehicle telematics unit sent from the residential electrical device in response to activity at a residence; and receiving a residence status message in response to activity at the residence while the vehicle is located away from the residence.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The method described below communicates information between a vehicle telematics unit and one or more residential electrical devices located at a residence. These communications can be initiated by either the vehicle telematics unit or the residence and carry a wide variety of information that relates to residence activity or commanding residential electrical devices. For instance, residential electrical devices can include electrical or electro-mechanical devices used in and around the residence. The residential electrical devices can send and receive messages to/from the vehicle via a wireless carrier system and land network. Also, the vehicle can send commands to the residential electrical devices via the wireless carrier system and land network. The residential electrical devices include motion detectors for home security systems, thermostats for residence HVAC, and personal computers (PCs) used at the residence. The communications between the vehicle and the residential electrical devices can raise or lower interior temperatures of the residence, activate a home security system after the vehicle has left the residence, alert vehicle occupants to people inside the residence, or convey notes between an individual at the residence and a vehicle occupant in the vehicle—to name a few.

Figure 1:
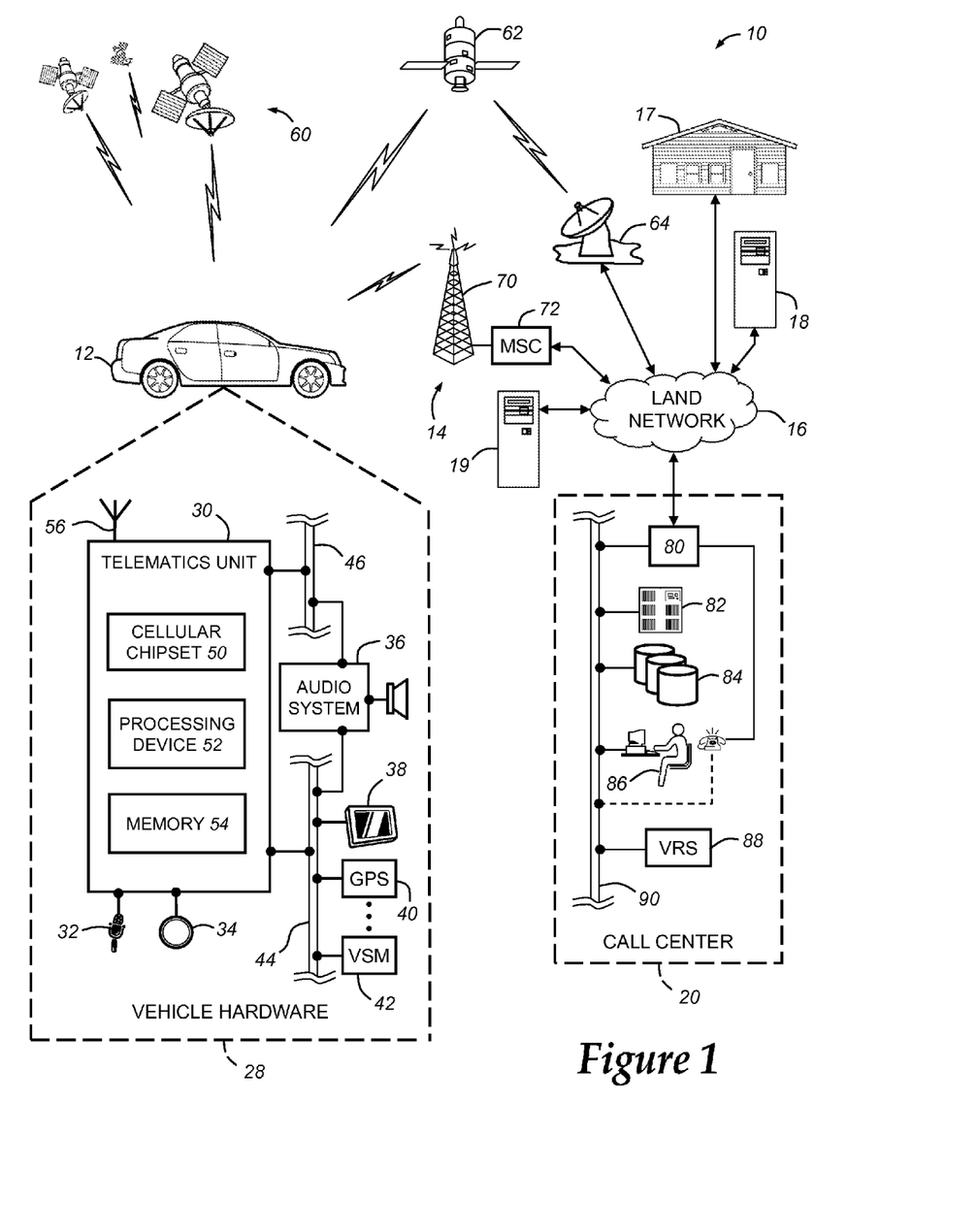
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

A residence 17 associated with a vehicle owner (or person who has control of the vehicle 12) includes one or more residential electrical devices. While called a "residence," the residence 17 can describe a vehicle owner's home, place of employment, or other geographical location (real or virtual) that includes one or more residential electrical devices (not shown). The residential electrical devices can be electrical or electromechanical devices used by the residence 17 under control of the vehicle owner/user. Examples of residential electrical devices include light switches, thermostats that regulate residential HVAC, a security system located at the residence 17, and an irrigation control device—to name a few. The residential electrical devices can be found within the residence 17 as well as located nearby on its property. It should be appreciated that the residential electrical devices described herein include the hardware and ability to communicate with the wireless carrier system 14 and/or the land network 16 thereby receiving computer-readable instructions that can control the devices. Each residential electrical device can be sent the computer-readable instructions and remotely controlled using an Internet protocol (IP) address. That is, the residence 17 may use an IP address assigned by the land network 16 and also implement a private network of IP addresses at the residence 17 that can assign a local IP address to each residential electrical device. Other implementations are possible in which the residential electrical device uses an IP address assigned to it by a Dynamic Domain Name Server (DDNS).

Using the lighting of the residence 17 as an example, each switch used to activate a light at the residence 17 can be a residential electrical device and individually addressable with instructions to control each switch with an executable or computer-readable command. Control of residential electrical devices, such as light switches, will be discussed in more detail below with respect to FIG. 2.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Residential electrical device server 19 can be a separate set of computers managed by the manufacturer or business entity that makes/sells one or more residential electrical devices and are accessible from the wireless carrier system 14 and/or land network 16. The residential electrical device server 19 can receive instructions or commands from the wireless carrier system 14 and/or land network 16 and, using one or more application programming interfaces (APIs), the server 19 can translate instructions into commands comprising language/format understandable by the residential electrical devices (if necessary). Also, the residential electrical device server 19 can receive information from residential electrical devices via the wireless carrier system 14 and/or land network 16 and forward that information on to a variety of recipients, such as the vehicle 12, the computer 18, and/or a call center 20. The terms "information" or "instruction" can be viewed as general information that can include a message or a information regarding a feature to control whereas "command" can refer to computer-executable language that can be acted on by a device. However, these terms may be discussed interchangeably below with respect to carrying out the described method.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
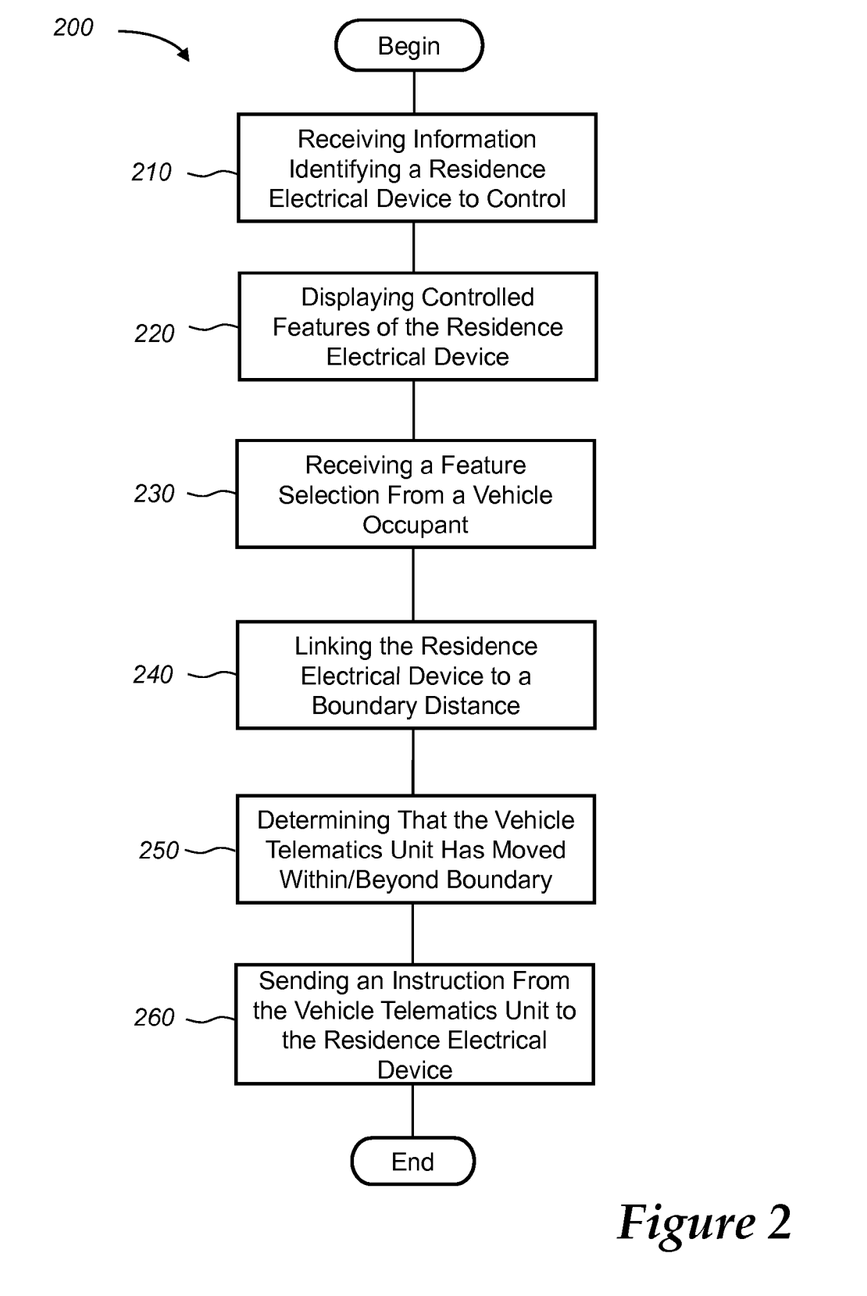
FIG. 2 is a flow chart depicting a method of communicating with residential electrical devices using the vehicle telematics unit.

Turning now to FIG. 2, there is shown an exemplary implementation of a method 200 of communicating with residential electrical devices using the vehicle telematics unit 30. The method 200 begins at step 210 by receiving information identifying a residential electrical device to control. Identity can include not only a location of the residential electrical device (such as an IP address) where instructions can be sent but also the name/type of the residential electrical device so that one residential electrical device can be distinguished from another device and it can be known what type of instruction or command to send. The instructions can be delivered in a variety of ways as well as provided by a number of different sources. For example, the vehicle owner can enter an IP address of the residence 17 at the vehicle 12 using the display 38 or some other input device. In addition to the IP address of the residence 17, the vehicle owner can identify the manufacturer and/or type of residential electrical device to be controlled. In another example, the vehicle owner can access a webpage provided by computer 18 or residential electrical device server 19 from the residence 17. Via the accessed webpage, the computer 18 or server 19 can detect the IP address at the residence 17 and the residential electrical devices at the residence 17 can be addressed using the IP address detected at the residence 17. The webpage can also include a database of different types of residential electrical devices, which the vehicle owner can use to identify the residential electrical devices that he or she wishes to control at the residence 17. Once the vehicle owner has identified the IP address at the residence 17 (by accessing the webpage or otherwise) and selected/identified one or more residential electrical devices to be controlled, this information can be saved as part of a user profile (at the computer 18, the residential electrical device server 19, or both). The method 200 proceeds to step 220.

At step 220, one or more controlled features of the identified residential electrical device(s) are displayed in the vehicle 12. Once the vehicle owner has identified the residential electrical device to be controlled, possible control options for the device(s) can be accessed and presented in the vehicle 12. Each residential electrical device can have a number of options available to control its features. For instance, a residential electrical device can be a light switch that turns a light on, turns a light off, or moves a rheostat for dimming the light. And these features can be identified based on the type of residential electrical device. When the vehicle owner inputs the identity of the residential electrical device, the particular options can be sent to the vehicle telematics unit 30 or alternatively accessed from digital memory devices 54 at the unit 30. Using the display 38, the vehicle 12 can present selectable buttons to turn the light switch off or turn the light switch on as well as a slide switch for dimming the switch. What is presented to control the features of each residential electrical device can change depending on the device to be controlled. In another example, when the residential electrical device is a thermostat controlling the HVAC system of the residence, the display 38 can present the temperature setting of the thermostat with arrow buttons to increase or decrease the temperature setting. Other options are possible, such as a humidity setting with another pair of arrow buttons. The thermostat can send the indoor temperature measured at the residence 17 to the vehicle 12 for presentation on the display 38.

It also should be appreciated that the display 38 can present one or more buttons that each represent a pre-defined or pre-saved group of features. This may be helpful when a plurality of residential electrical devices are controlled simultaneously. The display 38 in the vehicle 12 can present groups of features, which can be selected using a single button. And the group of features can be categorized by the location of the vehicle or the direction of vehicle travel. For instance, when the vehicle 12 is travelling away from the residence 17, the display 38 may present a "daytime-leaving" button that simultaneously controls light switches (turning off lights) as well as the thermostat (lowering the set temperature in the residence 17). Conversely, the display 38 can also offer an "evening-arriving" button that turns lights on and raises the temperature in the residence 17. The "daytime-leaving" and "evening-arriving" groups of features are merely examples of how different features can be combined. Other features can be combined into a group of settings such that a vehicle owner can customize the group of controlled features. The method 200 proceeds to step 230.

At step 230, a selection of the displayed controlled features of the residential electrical device is received from a vehicle occupant. After displaying the features of the residential electrical device in the vehicle 12, the vehicle occupant can control those features using input available at the vehicle 12. Such input can be received by the vehicle 12 using the display 38 described above. For instance, the display 38 can act as a touchscreen and present buttons that can be manipulated by the user. Besides selectable buttons, selectable arrows and sliding scales are other types of graphically-displayed inputs presented by the display 38 that can be manipulated by the user to control features of the residential electrical device. It should also be said that the vehicle occupant can select or control features of residential electrical devices using physical knobs and buttons located within the vehicle 12 instead of or in addition using the touchscreen capabilities of the display 38. The method 200 proceeds to step 240.

At step 240, the identified residential electrical device and/or features of that device are linked to a boundary distance measured from the residence 17. The location of the residence 17 can be determined and when the vehicle 12 moves away from or toward the residence 17, one or more residential electrical devices can be controlled based on this movement. Using the examples described above, a group of residential electrical devices can be collectively controlled and identified as "daytime-leaving." The vehicle owner or user can establish a distance from the residence 17 as a boundary that triggers control of the residential electrical device(s). This can also be referred to as a geofence that the vehicle owner establishes. The vehicle 12 can receive such as distance via the touchscreen features of the display 38. Or it is possible for the vehicle owner to access a webpage hosted by computer 18 and enter the boundary distance via the webpage. The boundary distance can then be wirelessly transmitted to the vehicle telematics unit 30. The method 200 proceeds to step 250.

At step 250, it is determined that the vehicle telematics unit 30 has moved within or beyond the boundary distance from the residence. Once a vehicle 12 crosses this boundary, the vehicle telematics unit 30 can detect such an occurrence using GPS module 40. When this occurs, the vehicle telematics unit 30 can determine if an instruction or command to control one or more features of a residential electrical device is linked to the boundary distance. If so, the vehicle telematics unit 30 can wirelessly transmit a signal that includes an instruction or command to control the features of the residential electrical device(s). The instruction/command can be received at the residence 17 itself or by the computer 18, server 19, or call center 20 any of which can then control the residential electrical devices or pass the command on to the residential electrical devices. This will be discussed below in more detail. The method 200 proceeds to step 260.

At step 260, an instruction or command is sent from the vehicle telematics unit 30 to the residential electrical device via the wireless carrier system 14 in response to the selection received from the user. The residential electrical device is controlled using the sent instruction or command. The communication pathway such an instruction/command passes through can vary as well as the ways the instruction/command is generated. For example, the vehicle telematics unit 30 can send a message that includes the instruction or command for controlling one or more features of one or more residential electrical devices. If the vehicle telematics unit 30 knows or can obtain the IP address of the residence 17, the unit 30 can send the message directly to the residence 17 via the wireless carrier system 14 and/or the land network 16. However, the message for controlling the features of residential electrical devices can pass through other elements shown in FIG. 1.

In some implementations, the message can be sent to computer 18 and interpreted by an API, which identifies the residential electrical devices to be controlled and generates computer-readable commands for each residential electrical device such that the commands will be understood by the residential electrical devices. It is also possible to sent the message controlling the features of residential electrical devices to one or more residential electrical device servers 19, which can interpret the message and generate computer-readable commands that are understandable by the residential electrical devices. This can be helpful in a residence 17 that uses multiple residential electrical devices. Multiple residential electrical device servers 19 can each generate commands to control residential electrical devices manufactured by the entity that controls each server 19. In one example of this, one residential electrical device server 19 can be operated by a light switch manufacturer while another residential electrical device server 19 can be operated by a thermostat operator. When the vehicle telematics unit 30 sends a message that controls both light switches and a thermostat, the message can be sent to both residential electrical device servers 19. The residential electrical device server 19 for light switches can send a command to the residence 17 to control light switches whereas a different residential electrical device server 19 can send a command to the residence to control the thermostat. In one implementation, these commands can be sent to the residential electrical device in response to detecting that the vehicle telematics unit 30 has moved within or beyond the boundary distance from the residence. The method 200 then ends.

Figure 3:
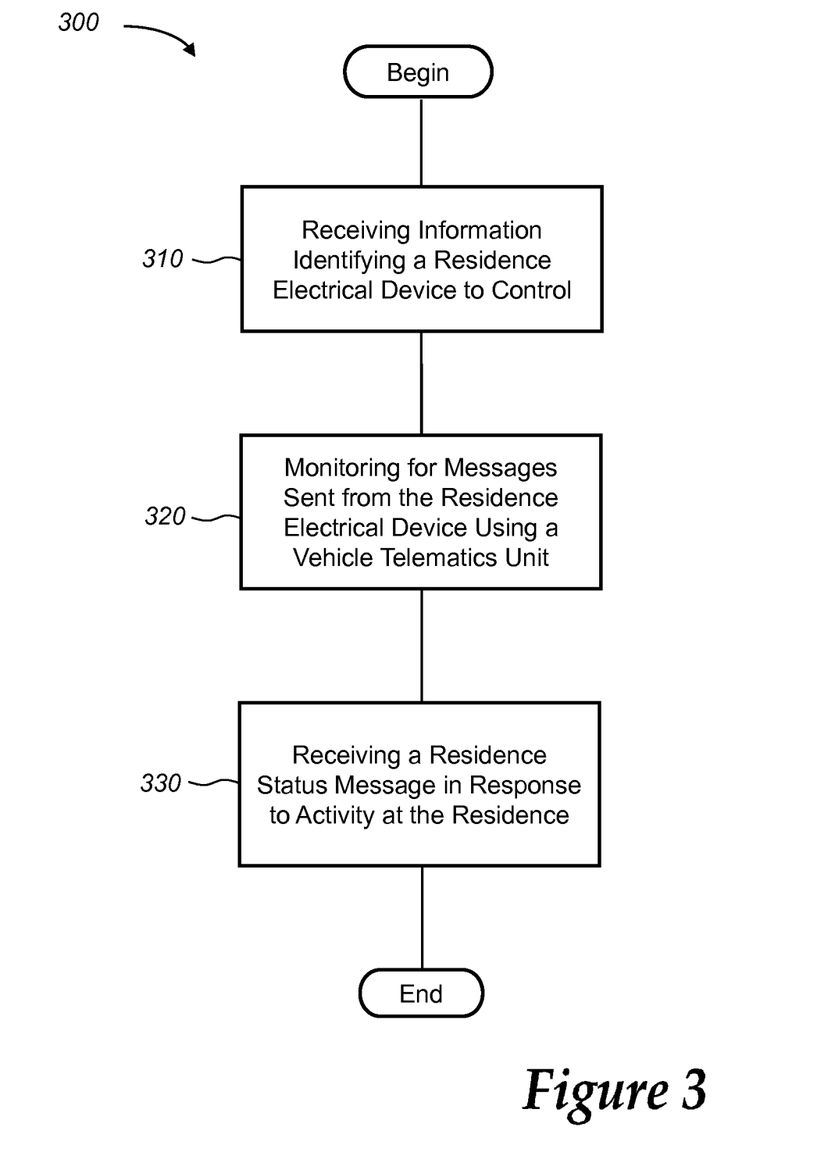
FIG. 3 is a flow chart depicting another method of communicating with residential electrical devices.

It should be appreciated that the above method 200 can also include one or more residential electrical devices that can send data or information to the vehicle 12. This is shown in FIG. 3 as a method 300 of communicating with residential electrical devices using the vehicle telematics unit 30. The method 300 begins at step 310 by receiving information identifying a residential electrical device to control. This step can be accomplished as described above with respect to step 210 of FIG. 2. The method 300 proceeds to step 320.

At step 320, the vehicle telematics unit 30 monitors for messages sent from the residential electrical device in response to activity at the residence 17. For example, the residence 17 may use one or more motion detectors as part of a home security system. The residential electrical device(s) (in this case motion detectors or the home security system) can generate a message and transmit that message to the vehicle telematics unit 30. When the motion detectors determine that someone is moving in the residence 17, the home security system can generate a residence status message that informs the vehicle 12 (and the vehicle occupant) that someone is moving in the residence 17. Other residential electrical devices can also communicate information to the vehicle 12. In another example, a personal computer (PC) can be a residential electrical device used at the residence 17 to send a residential status message to the vehicle 12. A person at the residence 17 can construct the residential status message at the residence 17 and send that message, which is ultimately received at the vehicle 12. The residential status message can be sent to the residential electrical device server 19, which can send the message to computer 18. The computer 18 or the server 19 can access the IP address of the vehicle telematics unit 30 from a DDNS and send the message to the unit 30. The method 300 proceeds to step 330.

At step 330, the residence status message (or other message) is received at the vehicle 12 in response to activity at the residence 17 while the vehicle 12 is located away from the residence 17. The vehicle telematics unit 30 can receive messages including information originally sent from one or more residential electrical devices located at the residence 17. The message can include a vehicle identifier, such as a vehicle identification number (VIN) or electronic serial number (ESN), and be received at the vehicle telematics unit 30 from the wireless carrier system 14, the computer 18, residential electronic device server 19, or call center 20. The computer 18, the residential electronic device server 19, and the call center 20 can identify the vehicle 12 using the vehicle identifier and forward the information included with the message to the vehicle telematics unit 30 via the wireless carrier system 14. It is also possible that the residence 17 can access a DDNS to obtain the IP address of the vehicle 12 and send the information directly to the vehicle telematics unit 30. Once received at the vehicle 12, the message can be displayed on the display 38 or the information included with the message can be audibly played within the vehicle 12. Using the motion detectors and the PC examples described above, the audio system 36 or display 38 can present the residential status message informing a vehicle occupant that the residence 17 is occupied. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating with a residential electrical device within a residence using a vehicle telematics unit, comprising the steps of:
    (a) receiving information identifying a residential electrical device to control, wherein the residential electrical device is associated with a remote residential electrical device server configured to control residential electrical devices located within a plurality of different residences;
    (b) displaying in a vehicle one or more controlled features of the identified residential electrical device;
    (c) receiving from a vehicle occupant a selection of the displayed controlled features of the residential electrical device;
    (d) sending an instruction from the vehicle telematics unit to the residential electrical device server associated with the residential electrical device in response to the received selection;
    (e) in response to the instruction received from the vehicle telematics unit, sending a command from the residential electrical device server to the residential electrical device through a wireless carrier system, a land network configured to provide public communications services external to the residence, or both;
    (f) receiving the sent command at the residential electrical device without utilizing an intervening server at the residence; and
    (g) controlling the residential electrical device using the sent command;
    wherein the residential electrical device server is operated by a manufacturer or business entity associated with a manufacturer of the residential electrical device.

2. The method of claim 1, further comprising the step of receiving at the vehicle the information identifying the residential electrical device.

3. The method of claim 1, wherein the information identifying the residential electrical device further comprises a make or a model of the residential electrical device.

4. The method of claim 1, wherein the information identifying the residential electrical device further comprises an Internet protocol (IP) address assigned to the residential electrical device.

5. The method of claim 1, wherein the information identifying the residential electrical device is received via a webpage.

6. The method of claim 1, further comprising the step of displaying the one or more controlled features in the vehicle in response to detecting a geographical boundary.

7. The method of claim 1, further comprising the steps of:
    sending the instruction from the vehicle telematics unit to a computer; and
    sending the instruction from the computer to a residential electrical device server.

8. A method of communicating with a residential electrical device within a residence using a vehicle telematics unit, comprising the steps of:

(a) receiving information identifying a residential electrical device to control, wherein the residential electrical device is associated with a remote residential electrical device server configured to control residential electrical devices located within a plurality of different residences;

(b) linking the identified residential electrical device to a boundary distance measured from a residence;

(c) determining that the vehicle telematics unit has moved within or beyond the boundary distance from the residence;

(d) sending an instruction from the vehicle telematics unit to the residential electrical device server associated with the residential electrical device in response to the determination in step (c); and (e) in response to the instruction received from the vehicle telematics unit, sending a command from the residential electrical device server to the residential electrical device through a wireless carrier system, a land network configured to provide public communications services external to the residence, or both;

(f) receiving the sent command at the residential electrical device without utilizing an intervening server at the residence; and (g) controlling the residential electrical device using the sent command;

wherein the residential electrical device server is operated by a manufacturer or business entity associated with a manufacturer of the residential electrical device.

9. The method of claim 8, further comprising the step of receiving at the vehicle the information identifying the residential electrical device.

10. The method of claim 8, wherein the information identifying the residential electrical device further comprises a make or a model of the residential electrical device.

11. The method of claim 8, wherein the information identifying the residential electrical device further comprises an Internet protocol (IP) address assigned to the residential electrical device.

12. The method of claim 8, further comprising the steps of:
determining if the command is in a format compatible with the residential electrical device.

13. The method of claim 8, further comprising the steps of:
sending the instruction from the vehicle telematics unit to a computer; and
sending the instruction from the computer to the residential electrical device server.

14. A method of communicating with a residential electrical device within a residence using a vehicle telematics unit, comprising the steps of:
(a) linking the vehicle telematics unit with a residential electrical device through a residential electrical device server that communicates with the residential electrical device through a wireless carrier system, a land network configured to provide public communications services external to the residence, or both, wherein the residential electrical device is controlled by a vehicle owner, and wherein communications between the residential electrical device, the vehicle telematics unit, and the residential electrical device server, transpire without utilizing an intervening server at the residence;
(b) monitoring for messages at the vehicle telematics unit sent from the residential electrical device in response to activity at a residence; and
(c) receiving a residence status message in response to activity at the residence while the vehicle is located away from residence;
wherein the residential electrical device server is operated by a manufacturer or business entity associated with a manufacturer of the residential electrical device.

15. The method of claim 14, further comprising the step of identifying the vehicle telematics unit using a vehicle identifier.

16. The method of claim 14, wherein the linking step further comprises receiving at the vehicle telematics unit information identifying the residential electrical device.

17. The method of claim 14, further comprising the step of receiving the residence status message from a residential electrical device server.

18. The method of claim 14, further comprising the steps of:
receiving the residence status message that has been sent via a computer and a residential electrical device server.

19. The method of claim 14, further comprising the step of generating the residence status message using a personal computer (PC) located at the residence.

* * * * *